(12) United States Patent
Keller et al.

(10) Patent No.: US 12,470,915 B2
(45) Date of Patent: Nov. 11, 2025

(54) DISTRIBUTED NETWORK EDGE SECURITY ARCHITECTURE

(71) Applicant: Telefonaktiebolaget LM Ericsson (publ), Stockholm (SE)

(72) Inventors: Ralf Keller, Würselen (DE); George Foti, Dollard des Ormeaux (CA); Bengt Sahlin, Espoo (FI); Mary Amarisa Robison, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 18/579,676

(22) PCT Filed: Jul. 20, 2022

(86) PCT No.: PCT/EP2022/070334
§ 371 (c)(1),
(2) Date: Jan. 16, 2024

(87) PCT Pub. No.: WO2023/001881
PCT Pub. Date: Jan. 26, 2023

(65) Prior Publication Data
US 2024/0334184 A1    Oct. 3, 2024

Related U.S. Application Data

(60) Provisional application No. 63/224,196, filed on Jul. 21, 2021.

(51) Int. Cl.
*H04W 12/037*    (2021.01)
*H04W 8/00*    (2009.01)
(Continued)

(52) U.S. Cl.
CPC ......... *H04W 12/037* (2021.01); *H04W 8/005* (2013.01); *H04W 84/042* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 10,834,571 B1 * | 11/2020 | Yau | H04W 12/06 |
| 2021/0219137 A1 | 7/2021 | Bykampadi et al. | |
| 2022/0104020 A1 * | 3/2022 | Rajput | H04W 12/12 |

FOREIGN PATENT DOCUMENTS

| | | | | |
|---|---|---|---|---|
| EP | 4050968 A1 | 8/2022 | | |
| EP | 4075721 A1 * | 10/2022 | ........... | H04L 63/102 |
| WO | WO-2020053480 A1 * | 3/2020 | ............... | H04L 9/14 |

OTHER PUBLICATIONS

3rd Generation Partnership Project, "Technical Specification Group Core Network and Terminals; 5G System; Public Land Mobile Network (PLMN) Interconnection; Stage 3 (Release 17)", Technical Specification, 3GGP TS 29.573 V17.1.0, Jun. 2021, pp. 1-102, 3GPP.

(Continued)

*Primary Examiner* — Jeffrey R Swearingen
(74) *Attorney, Agent, or Firm* — COATS & BENNETT, PLLC

(57) ABSTRACT

A method, implemented by a security relay node in a Public Land Mobile Network, PLMN, wherein the method comprising the steps of receiving, from a Network Function, NF, within the PLMN, a control packet to be provided to a further PLMN, relaying said control packet to a remote security node for delivery of the control packet to the further PLMN, wherein the remote security node being outside of both the PLMN and being outside the further PLMN.

26 Claims, 7 Drawing Sheets

(51) Int. Cl.
*H04W 84/04* (2009.01)
*H04W 92/18* (2009.01)

(56) References Cited

OTHER PUBLICATIONS

Nokia, "N32 interface", Change Request, TSG-SA3 Meeting #100e, e-meeting, Aug. 17-28, 2020, pp. 1-22, S3-201796, 3GPP.
Nokia, "Adding normative text on SEPP to the security architecture section", TSG SA WG3 (Security) Meeting #90Bis, San Diego, United States, Feb. 26, 2018-Mar. 2, 2018, pp. 1-2, S3-180675, 3GPP.

\* cited by examiner

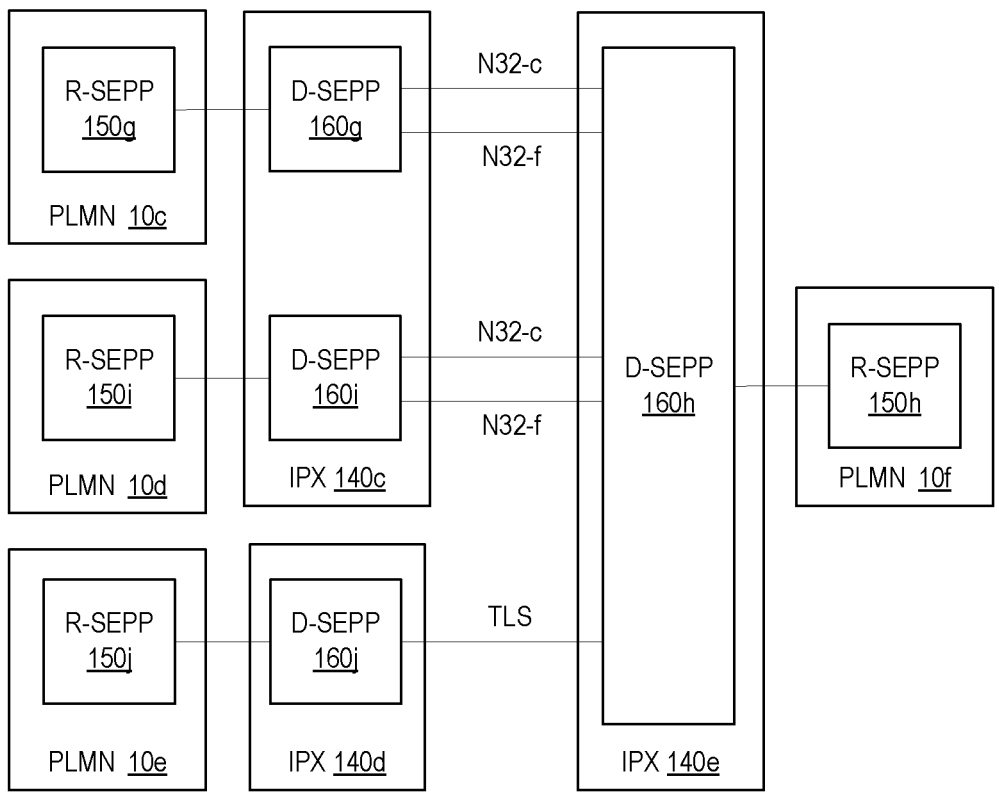
FIG. 3C
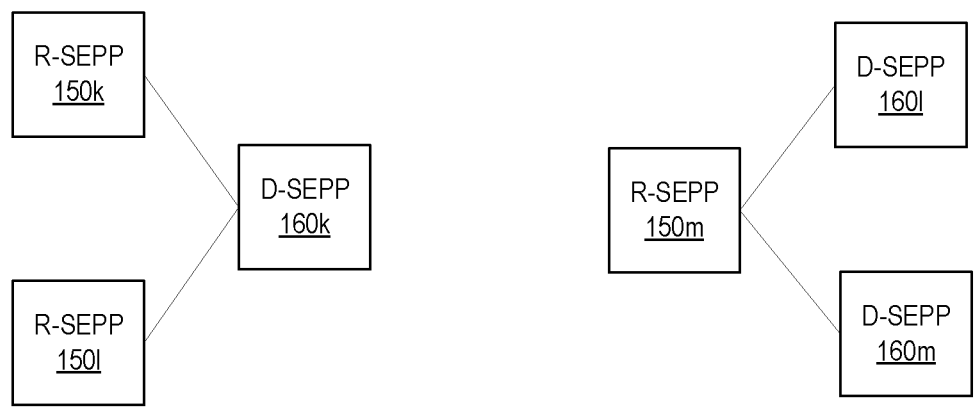
FIG. 3D
FIG. 3E

200

```
RELAYING OUTBOUND CONTROL PLANE TRAFFIC, RECEIVED FROM A
SOURCE WITHIN THE PLMN, TO A REMOTE SECURITY NODE VIA A SECURE
INTERFACE FOR DELIVERY OF THE OUTBOUND CONTROL PLANE TRAFFIC
TO A FURTHER PLMN, THE REMOTE SECURITY NODE BEING OUTSIDE OF
BOTH THE PLMN AND THE FURTHER PLMN
210
```

```
RELAYING INBOUND CONTROL PLANE TRAFFIC, RECEIVED FROM THE
FURTHER PLMN VIA THE REMOTE SECURITY NODE OVER THE SECURE
INTERFACE, TO A DESTINATION WITHIN THE PLMN
220
```

```
RELAYING OUTBOUND CONTROL PLANE TRAFFIC, RECEIVED FROM A
SECURITY RELAY NODE WITHIN A PLMN VIA A SECURE INTERFACE, TO A
FURTHER PLMN, THE REMOTE SECURITY NODE BEING OUTSIDE OF BOTH
THE PLMN AND THE FURTHER PLMN
310
```

```
RELAYING INBOUND CONTROL PLANE TRAFFIC, RECEIVED FROM A
SOURCE WITHIN THE FURTHER PLMN, TO THE SECURITY RELAY NODE VIA
THE SECURE INTERFACE
320
```

FIG. 7

DISTRIBUTED NETWORK EDGE SECURITY ARCHITECTURE

BACKGROUND

This disclosure generally relates to the field of wireless communication networks. Modern wireless communication networks are highly interconnected with other networks. Many of these networks have relationships with each other so that continuity of service can be provided to User Equipment (UE) that roam between those networks. Each other network is a potential source of disruption, e.g., in the form of malicious software, data scraping, spoofing, denial of service attacks, credential theft, and/or other security risks. To combat such security threats, security functions are commonly placed at the edges of networks. Notably, as the number of neighboring networks increases, the computational burden on security functions at the network edge also increases.

SUMMARY

Examples of the present disclosure are generally directed to a distributed security architecture that uses different nodes to securely protect control signaling at the network edge.

Particular examples of the present disclosure include a method implemented by a security relay node in a Public Land Mobile Network (PLMN). The method comprises receiving, from a Network Function, NF, within the PMLN, a control packet to be provided to a further PLMN and relaying the control packet to a remote security node for delivery of the control packet to the further PLMN. The remote security node is outside of both the PLMN and the further PLMN. The method further comprises relaying inbound control plane traffic, received from the further PLMN via the remote security node, to a destination within the PLMN.

In some examples, the method comprises the step of establishing a secure interface between the security relay node and the remote security relay node, preferably based on a standardized N32 interface, and wherein the step of relaying comprises relaying the control packet over the established secure interface.

In some examples, relaying the inbound and outbound data plane traffic comprises relaying using Transport Layer Security (TLS).

In some examples, the method further comprises, prior to the step of relaying the control packet, the step of encrypting at least an Information Element, IE, in the control packet.

The encrypting step may be performed using an encryption key of a peer security node of the further PLMN obtained via the remote security node. The peer security node may thus be comprised by the further PLMN.

The method may comprise the step of obtaining the encryption key of the peer security node from the remote security node.

In some example, the method further comprises exchanging, with the remote security node, control signaling associated with the secure interface. In some such embodiments, the secure interface is an N32-f interface and exchanging the control signaling comprises exchanging the control signaling via an N32 c interface to set up the N32-f interface. In other such embodiments, relaying the outbound and inbound control plane traffic via the secure interface comprises relaying the outbound and inbound control plane traffic via a TLS connection and exchanging the control signaling comprises exchanging the control signaling via the TLS connection.

In some examples, the method further comprises enabling discovery of the security relay node by at least one network function of the PLMN by registering with a Network Repository Function (NRF) of the PLMN as a Security Edge Protection Proxy (SEPP).

In some examples, the method further comprises hiding a topology of the PLMN from the further PLMN.

In some examples, the method further comprises using a telescopic fully qualified domain name of a network function in the PLMN to hide an address of the network function from the further PLMN.

In some examples, the method further comprises exchanging security certificates with the remote security node and relaying the inbound and outbound control plane traffic is responsive to authenticating the remote security node using a security certificate of the remote security node.

In some examples, the method further comprises encrypting an information element (IE) using an encryption key of a peer security node of the further PLMN obtained via the remote security node. The method further comprises transmitting the encrypted IE to the peer security node via the remote security node. In some such examples, the method further comprises obtaining the encryption key of the peer security node from the remote security node.

In some examples, the remote security node is comprised in an Internet Protocol Exchange (IPX) network. In some other embodiments, the remote security node is comprised in a roaming hub network.

Other examples include a security relay node comprising processing circuitry and a memory. The memory contains instructions executable by the processing circuitry whereby the security relay node is configured to, from within a Public Land Mobile Network (PLMN), relay outbound control plane traffic, received from a source within the PLMN, to a remote security node via a secure interface for delivery of the outbound control plane traffic to a further PLMN. The remote security node is outside of both the PLMN and the further PLMN. The security relay node is further configured to relay inbound control plane traffic, received from the further PLMN via the remote security node over the secure interface, to a destination within the PLMN.

In another example, security relay node comprising processing circuitry and a memory, the memory containing instructions executable by the processing circuitry whereby the security relay node is configured for, from within a Public Land Mobile Network, PLMN; receiving, from a Network Function, NF, within the PLMN, a control packet to be provided to a further PLMN; relaying said control packet to a remote security node for delivery of the control packet to the further PLMN, the remote security node being outside of both the PLMN and the further PLMN.

In some examples, the security relay node is further configured to perform any of the methods described above.

Other examples include a computer program, comprising instructions which, when executed on processing circuitry of a security relay node, cause the processing circuitry to carry out any of the methods described above.

Other embodiments include a carrier containing such a computer program. The carrier is one of an electronic signal, optical signal, radio signal, or computer readable storage medium.

Yet other examples include a method implemented by a remote security node. The method comprises receiving, from a security relay node in a Public Land Mobile Network, PLMN, a control packet to be provided to a further PLMN, and relaying the control packet to the further PLMN, wherein the remote security node being outside of both the PLMN and the further PLMN.

IN some example, the method comprises the step of establishing a secure interface between the security relay node and the remote security relay node, preferably based on a standardized N32 interface, and wherein the step of receiving comprises receiving the control packet over the established secure interface.

In some examples, relaying any inbound and outbound control plane traffic comprises relaying using TLS.

In some example, the method comprises the step of receiving, the control packet in which at least an Information Element, IE, is encrypted.

The encryption may be performed using an encryption key of a peer security node of the further PLMN such that the remote security node is unable to decrypt it. The encryption key may be obtained from the peer security node of the further PLMN, and may be provided to the remote security node.

In some examples, the method further comprises exchanging, with the security relay node, control signaling associated with the secure interface. In some such embodiments, the secure interface is an N32-f interface and exchanging the control signaling comprises exchanging the control signaling via an N32-c interface to set up the N32-f interface. In other such embodiments, relaying the outbound and inbound control plane traffic via the secure interface comprises relaying the outbound and inbound control plane traffic via a TLS connection and exchanging the control signaling comprises exchanging the control signaling via the TLS connection.

In some examples, the method further comprises relaying further control plane traffic between the PLMN and an additional PLMN. The method further comprises isolating the inbound and outbound control plane traffic relaying between PLMN and the further PLMN from the further control plane traffic relayed between the PLMN and the additional PLMN.

In some examples, the method further comprises hiding a topology of the PLMN from the further PLMN.

In some examples, the method further comprises exchanging security certificates with the security relay node and relaying the inbound and outbound control plane traffic is responsive to authenticating the security relay node using a security certificate of the security relay node.

In some examples, the method further comprises receiving, from the security relay node, an information element (IE) encrypted with an encryption key of a peer security node of the further PLMN. The method further comprises forwarding the encrypted IE to the peer security node. In some such examples, the method further comprises encrypting a further IE with the encryption key of the peer security node and forwarding the encrypted further IE along with the encrypted IE to the peer security node. In some examples, the method additionally or alternatively comprises obtaining the encryption key of the peer security node from the peer security node and providing the encryption key of the peer security node to the security relay node.

In some embodiments, the remote security node is comprised in an Internet Protocol Exchange (IPX) network. In some other examples the remote security node is comprised in a roaming hub network.

Other examples include a remote security node comprising processing circuitry and a memory. The memory contains instructions executable by the processing circuitry whereby the security relay node is configured to relay outbound control plane traffic, received from a security relay node within a PLMN via a secure interface, to a further PLMN. The remote security node is outside of both the PLMN and the further PLMN. The security relay node is further configured to relay inbound control plane traffic, received from a source within the further PLMN, to the security relay node via the secure interface.

In some examples, the remote security node is further configured to perform any of the methods implemented by a remote security node described above.

Other examples include a computer program comprising instructions which, when executed on processing circuitry of a remote security node, cause the processing circuitry to carry out any one of the remote security node methods described above.

Other examples include a carrier containing such a computer program. The carrier is one of an electronic signal, optical signal, radio signal, or computer readable storage medium.

Other examples are described in further detail below with respect to the accompanying figures.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a Public Land Mobile Network (PLMN) 10, generally, as opposed to discussion of particular instances of PLMNs 10*a*, 10*b*).

FIGS. 3A-E are schematic block diagrams illustrating example distributed network edge security architectures, according to particular examples of the present disclosure.

FIG. 6 is a flow diagram illustrating of an example method implemented by a security relay node, according to one or more examples of the present disclosure.

FIG. 7 is a flow diagram illustrating of an example method implemented by a remote security node, according to one or more examples of the present disclosure.

DETAILED DESCRIPTION

In general, the discussion below is provided in the context of a 5G wireless communication network. Notwithstanding, those skilled in the art will appreciate that the techniques and solutions provided below are not limited in their applicability to 5G networks. Indeed, many of the teachings provided below may also be used in wireless communication networks operating according to other standards. In particular, the examples described below may be particularly well suited for (but not limited to) derivatives of, and/or successors to, 5G networks, for example. Other examples may additionally or alternatively be used in predecessor Third Generation Partnership Project (3GPP) networks.

Figure 1:
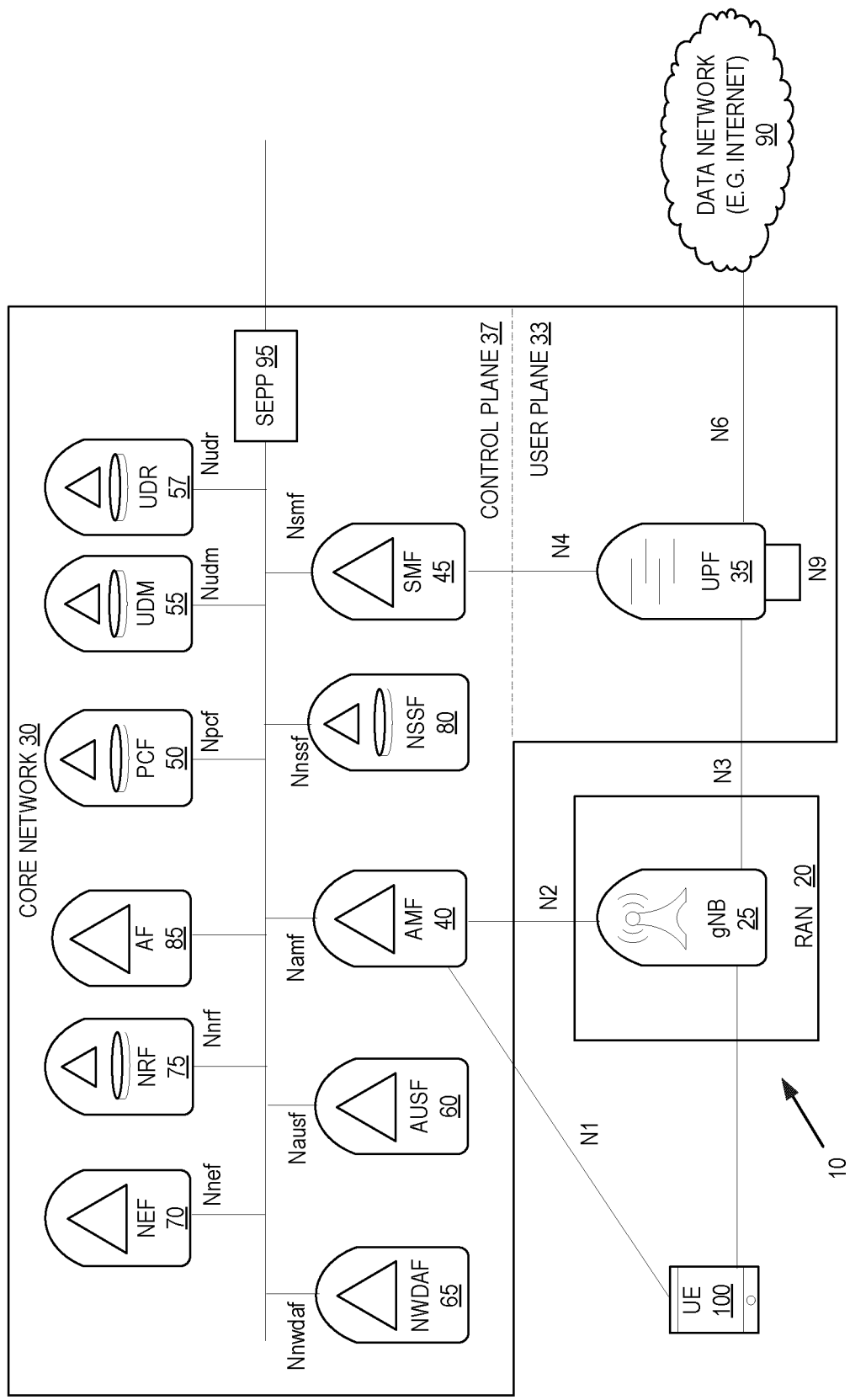
FIG. 1 is a schematic block diagram illustrating an example of a PLMN that provides a User Equipment (UE) with access to a data network, according to one or more examples of the present disclosure.

FIG. 1 illustrates an example wireless communication network that is consistent with the 3GPP 5G system architecture. The wireless communication network comprises a radio access network (RAN) 20 and a core network 30 employing a service-based architecture. The RAN 20 and the core network 30, when operated by the same operator, are sometimes collectively referred to as a Public Land Mobile Network (PLMN) 10 of the operator.

The RAN 20 comprises one or more base stations 25 that are configured to provide radio access to one or more UEs 100 operating within a coverage area of the PLMN 10. The base stations 25 may be referred to as gNodeBs (gNBs). The core network 30 provides a connection between the RAN 20 and one or more data networks (DNs) 90, such as the Internet, for example. In this example, the PLMN 10 is a Visited PLMN (VPLMN) that provides a local breakout to the DN 90. That said, in other examples to be discussed in greater detail below, the PLMN 10 of particular embodiments may instead provide a home-routed user plane to the Home PLMN (HPLMN).

The core network 30 comprises a plurality of network functions (NFs). These NFs may be in either the user plane 33 or the control plane 37 of the core network 30. The user plane 33 (sometimes referred to as the data plane) typically carries user data traffic. The control plane 37 typically carries signaling traffic (e.g., control packets).

In this example, the NFs of the user plane 33 comprise a User Plane Function (UPF) 35. The NFs of the control plane 37 comprise an Access and Mobility Management Function (AMF) 40, a Session Management Function (SMF) 45, a Policy Control Function (PCF) 50, a Unified Data Management (UDM) function 55, a Unified Data Repository (UDR) function 57, an Authentication Server function (AUSF) 60, a Network Data Analytics Function (NWDAF) 65, a Network Exposure Function (NEF) 70, a Network Repository Function (NRF) 75, and a Network Slice Selection Function (NSSF) 80. The control plane 37 of the core network 30 also includes an Application Function (AF) 85, and a Security Edge Protection Proxy (SEPP) 95.

The NFs of the core network 30 comprise logical entities that reside in one or more core network nodes, which may be implemented using computing hardware, such as one or more processors, memory, network interfaces, or a combination thereof. The functions may reside in a single core network node or may be distributed among a plurality of core network nodes. The NFs may communicate with one another using predefined interfaces. Some of the interfaces are referred to by standardized reference points within the network, whereas other interfaces are simply named.

N1 is a reference point between a UE 100 and the AMF 40. N2 is a reference point between the RAN 20 and the AMF 40. The N3 is a reference point between the RAN 20 and the UPF 35. N4 is a reference point between the SMF 45 and the UPF 35. N6 is a reference point between the UPF 35 and the DN 90. N9 is a reference point between UPFs 35. Several of the NFs expose a service-based interface named after them in the format Nxxx, wherein xxx is the name of the NF. For example, the NEF 70 provides an Nnef interface, the NRF 75 provides an Nnrf interface, and so on.

Figure 2:
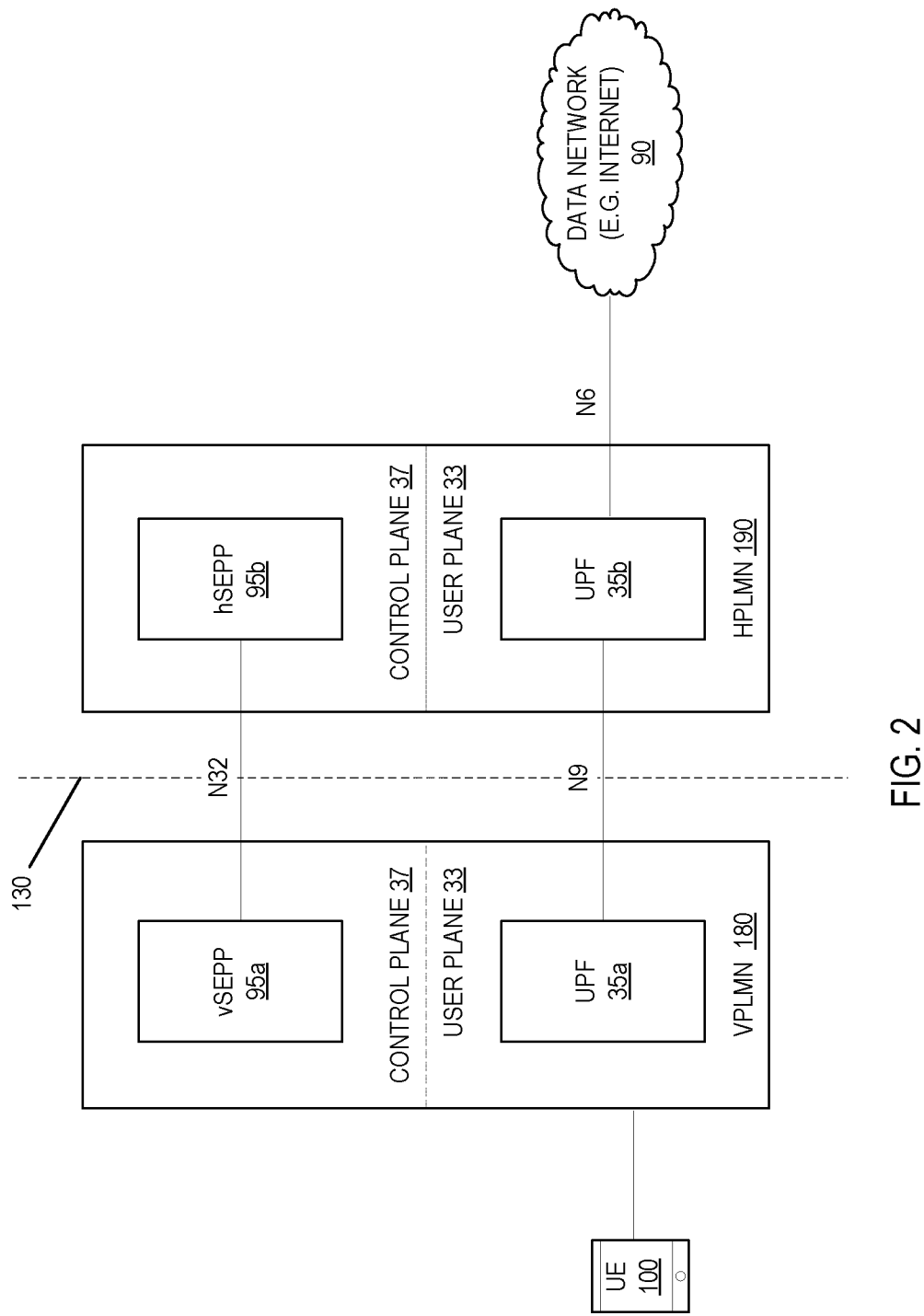
FIG. 2 is a schematic block diagram illustrating an example network environment supporting inter-PLMN communication, according to one or more embodiments of the present disclosure.

The SEPP 95 is a proxy for control plane messages configured to protect the edge of an operator network. FIG. 2 illustrates an example of a UE 100 that has roamed away from its Home PLMN (HPLMN) 180 and is currently attached to a VPLMN 190. In contrast to FIG. 1, FIG. 2 illustrates a home-routed scenario in which break out to the DN 90 occurs at an HPLMN 190. For clarity of explanation, the involved control plane nodes other than the SEPPs are not depicted. The VPLMN 180 and the HPLMN 190 use a Visited SEPP (vSEPP) 95a and a Home SEPP (hSEPP) 95b, respectively, to provide security functions at the edge 130 between the PLMNs 180, 190. The vSEPP 95a and the hSEPP 95b communicate with each other over an N32 interface. These SEPP 95a, 95b may alternatively be referred to based on whether the SEPP 95 is on the service consumer side or the service provider side. A SEPP 95 on the service consumer side may be referred to as a c-SEPP whereas a SEPP 95 on the service provider side may be referred to as a p-SEPP.

The SEPP 95 of a given network may be required to provide security functions for a great many roaming relations that the operator has with other networks, which may be hundreds, for example. Supporting such a significant number of roaming relations can place a substantial computational burden on the SEPP 95 and a substantial management burden on the PLMN 10.

Figure 3A:
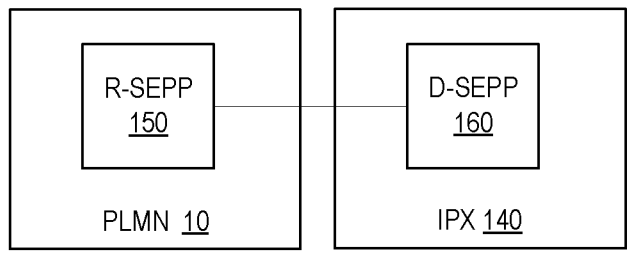

To avoid having an overburdened SEPP 95 in the network 10, embodiments of the present disclosure delegate some aspects of the SEPP 95 to a provider that is outside of the network 10. For example, certain functions that might otherwise be performed by the SEPP 95 may instead be delegated from a security NF in the PLMN 10 to a security NF outside of the PLMN 10 (e.g., operated by an Internet Protocol (IP) Exchange (IPX) 140 provider), as shown in FIG. 3A. In the example of FIG. 3A, certain functions that ordinarily might be provided by a SEPP 95 are instead provided using a distributed SEPP architecture that comprises a Relay SEPP (R-SEPP) 150 in the PLMN 10 and a Delegated SEPP (D-SEPP) 160 outside of the PLMN 10 (e.g., in the IPX 140).

The R-SEPP 150 and D-SEPP 160 may exchange information between themselves over one or more secure interfaces. In this regard, the R-SEPP 150 and D-SEPP 160 may use any appropriate protocol for ensuring the security of the interface(s) between them, including (but not limited to) Transport Layer Security (TLS). Particular examples of interfaces and protocols used in accordance with particular embodiments will be discussed in greater detail below.

According to particular embodiments of the present disclosure, the R-SEPP 150 may be responsible for relaying signaling between NFs and Service Communication Proxies (SCPs) to and/or from the D-SEPP 160. In some embodiments, the R-SEPP may be included in signaling as standardized in 3GPP (e.g., by specific configuration or by NRF discovery). In at least some such embodiments, the R-SEPP 150 may register as a SEPP 95 in an NRF 75, e.g., so that the R-SEPP 150 may be discovered by one or more NFs.

Additionally or alternatively, in some embodiments (and to the extent such is not delegated to the D-SEPP 160), the R-SEPP 150 may perform topology hiding, provide certain roaming related security functions, perform telescopic Fully Qualified Domain Name (FQDN) handling, and/or provide firewalling for its own PLMN 10.

Correspondingly, the D-SEPP 160 interacts with the R-SEPP 150 (e.g., by receiving and forwarding messages received from the R-SEPP 150) and may handle some or all roaming relations and/or N32 connections (e.g., Protocol for N32 Interconnect Security (PRINS) and/or Transport Layer Security (TLS) connections) to roaming partners. In fulfilling its role, the D-SEPP 160 of particular embodiments may support interaction with multiple R-SEPPs 150, and may select the appropriate R-SEPP for incoming and/or forwarded requests.

The D-SEPP 160 may support the networks of roaming partners regardless of whether or not they have also adopted a distributed SEPP architecture. That is, in some embodiments, one or more of these roaming partners may adopt a similar distributed SEPP architecture that includes an R-SEPP 150 and a D-SEPP. Additionally or alternatively, one or more of these roaming partners may use a conventional SEPP 95 for security at the network edge.

The PLMN 10 may require that the D-SEPP 160 use certain secure protocols. For example, the PLMN 10 may require that PRINS be used on an N32-f interface. Additionally or alternatively, the PLMN 10 may require that TLS be used on N32-f and/or N32-c connections. In this regard, the D-SEPP 160 may, e.g., be configured in this way due to a contractual agreement between operators. In at least some such scenarios, the D-SEPP 160 interacts with SEPPs 90 in other PLMNs, whereas the R-SEPP 150 does not. Further, in at least some embodiments, the D-SEPP 160 performs firewalling unique to one or more roaming partners.

In at least some embodiments, the D-SEPP further maintains proper bindings between R-SEPPs and roaming agreements, may perform topology hiding (to the extent not performed by the R-SEPP 150) and/or isolates the traffic of different PLMNs 10 from each other.

Figure 3B:
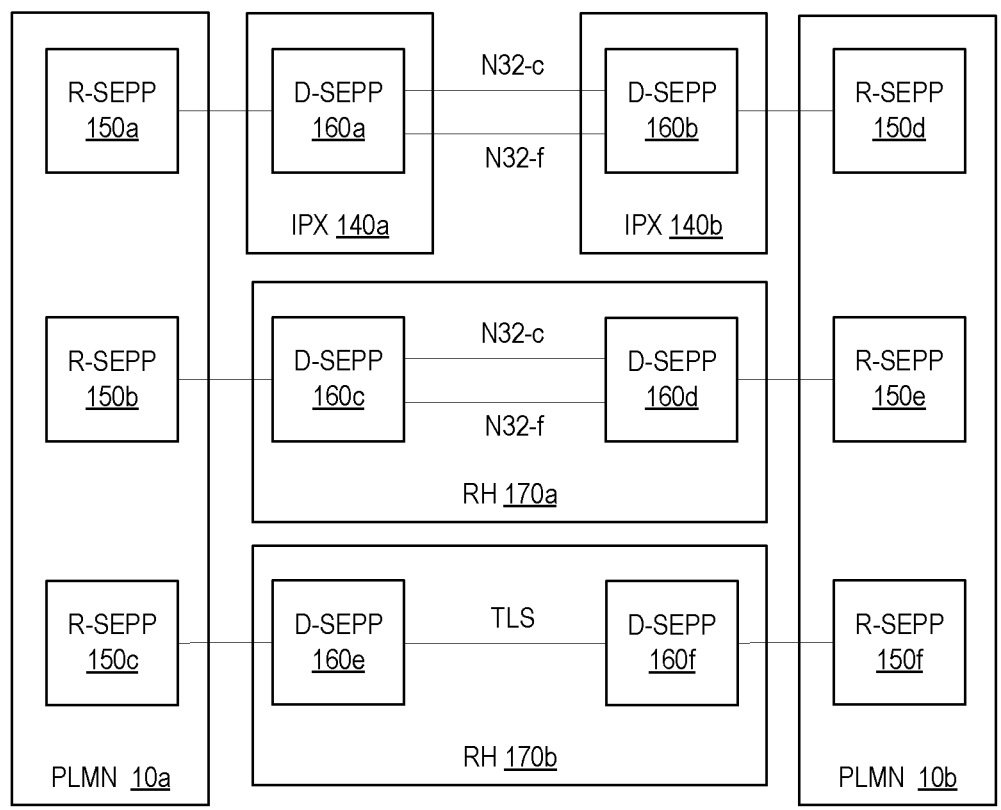

Particular embodiments may include more than one D-SEPP 160, as illustrated in the example of FIG. 3B. FIG. 3B illustrates an example of in which two PLMNs 10a, 10b communicate with each other using a distributed SEPP architecture. In particular, PLMN 10a comprises R-SEPPs 150a-c, whereas PLMN 10b comprises R-SEPPs 150d-f.

Each R-SEPP 150a-f is associated with a corresponding D-SEPP 160a-f. In particular, R-SEPP 150a uses corresponding D-SEPP 160a to communicate with PLMN 10b. In this example, PLMN 10b comprises an R-SEPP 150d that similarly uses a corresponding D-SEPP 160b to communicate with PLMN 10a. The D-SEPPs 160a, 160b are in respective IPXs 140a, 140b and communicate with each other using the N32-c interface and the N32-f interface. The N32-c interface is a control plane interface, e.g., for performing initial handshaking and negotiating parameters to be applied for N32 message forwarding. The N32-f interface is a forwarding interface, e.g., for forwarding communication between NFs in the different PLMNs 10a, 10b.

R-SEPP 150b uses corresponding D-SEPP 160c to communicate with R-SEPP 150e via its corresponding D-SEPP 160d. The D-SEPPs 160c, 160d are comprised in the same Roaming Hub (RH) 170a and communicate with each other using their own N32-c and N32-f interfaces.

R-SEPP 150c uses corresponding D-SEPP 160e to communicate with R-SEPP 150f via its corresponding D-SEPP 160f. The D-SEPPs 160e, 160f are comprised in the same Roaming Hub (RH) 170b and communicate with each other using TLS.

Accordingly, if two D-SEPPs 160 are in distinct deployments (e.g., as in IPXs 140a, 140b), they may, in some embodiments, interact in accordance with a standard N32 interface. If the two D-SEPPs 160 are operated by a single company in the same deployment (e.g., without a national or international interconnect in between, such as in a roaming hub 170a or 170b), then the communication between the D-SEPPs may be comprised within that deployment.

Moreover, either PRINS or TLS can be used in between D-SEPPs. When TLS is used, each D-SEPP 160 may be required to find the right target D-SEPP 160 in order to establish a TLS connection. For example, D-SEPP 160e may be required to discover D-SEPP 160f, and/or vice versa.

FIG. 3C illustrates an example of embodiments that include communication between multiple PLMNs 10c-f. Each of the PLMNs 10c-f comprises its own R-SEPP 150g-j, each of which interacts with a respective D-SEPP 160g-j. Although D-SEPP 160g and D-SEPP 160i are operated by the same IPX 140c provider, the D-SEPPs 160g and 160i are isolated from each other. D-SEPP 160j is operated by a different IPX 170d provider than that of D-SEPPs 160g, 160i. In this example, each of the PLMNs 10c-e has a roaming relation with PLMN 10f.

In the context of the present disclosure the R-SEPP 150a may, for example, be referred to as the security relay node and the R-SEPP 150d may, for example, be referred to as the peer security node of the PMLN. The D-SEPP's 160a-f may be referred to as the remote security node.

Among other things, the above examples illustrate that particular embodiments split SEPP functionality into two roles, with a transport solution in between. In some embodiments, the D-SEPP 160 may select the R-SEPP 150 (e.g., for outgoing requests). Additionally or alternatively, in some embodiments, different R-SEPPs 150k, 150l may connect to the same D-SEPP 160k, as shown in FIG. 3D. One or more of the embodiments described herein may be used for roaming hub deployments, e.g., without negatively impacting roaming partners. In particular, one or more embodiments securely expands the "Service Based Interface (SBI) domain" of an operator to include both the R-SEPP 150 and D-SEPP 160 while allowing the D-SEPP 160 to be operated by a different company (e.g. an IPX provider).

As mentioned above, the protocol used between R-SEPP 150 and D-SEPP 160 may, in some particular embodiments, use a TLS connection (through there may be no need for a specific protocol unless, e.g., the R-SEPP 150 needs to provide certain additional information to the D-SEPP 160 that cannot be otherwise be derived from forwarded messages). Although particular embodiments include an R-SEPP 150m that uses multiple D-SEPPs 160l, 160m (as shown in FIG. 3E), it is expected that under most circumstances, any additional D-SEPPs 160 in a multiple D-SEPP 160 scenario would be used by the R-SEPP 150 purely for redundancy purposes. Should there be a need to provide additional information to the D-SEPP 160 that cannot be derived from forwarded messages, the N32 may be used in certain embodiments.

Embodiments of the present disclosure may adopt a variety of security and trust models with respect to the various network nodes described herein. For example, in some embodiments, the D-SEPP 160 may belong to the security domain of the PLMN 10 of its corresponding R-SEPP 150. That said, according to other embodiments, the D-SEPP 160 and R-SEPP 150 may be deployed like an intranet/extranet/internet trust model, in which the D-SEPP 160 is treated analogously to an extranet device and the R-SEPP 150 is treated analogously to an intranet device. In particular, in at least some embodiments, the D-SEPP 160 only connects to the PLMN 10 through the R-SEPP 150, and cannot connect directly to any other NF in the PLMN 10.

Although certain embodiments may use a standard N32 interface between the R-SEPP 150 and D-SEPP 160, other embodiments may simply support TLS between the R-SEPP 150 and D-SEPP 160. In this regard, the D-SEPP 160 essentially represents the PLMN 10 among its neighbors, and the R-SEPP 150 should not be visible outside the PLMN 10. That said, other interfaces may be suitable between the R-SEPP 150 and D-SEPP 160. For example, some derivation of the N32 interface may be appropriate between the R-SEPP 150 and D-SEPP 160 (e.g., a streamlined or reduced N32 interface). In some particular embodiments, the D-SEPP 160 supports both an interface to the R-SEPP 150 as well as a standardized N32 interface to other SEPPs 95. The latter may imply to support TLS, PRINS, or even both on N32-f. Additionally or alternatively, Remote Value Added Services (RVAS) may be provided by either the R-SEPP 150 or the D-SEPP 160. Such embodiments may be advantageous if, e.g., the Global System for Mobile communications Association (GSMA) begins to support RVAS in SEPP 95 scenarios. In particular, should RVAS be provided by an IPX 170 provider hosting a D-SEPP 160, that D-SEPP 160 may be particularly appropriate.

As mentioned above, TLS (and/or other security protocol) may be used to protect the interface between the R-SEPP 150 and the D-SEPP 160. Accordingly, the R-SEPP 150 and D-SEPP 160 may need to exchange certificates by which to mutually authenticate each other, as well as to protect the confidentiality and integrity of the interface. Delegating SEPP 95 functionality to a D-SEPP 160 may, in some embodiments, require that the D-SEPP 160 holds a certificate on behalf of the PLMN 10 that is used for securely connecting to the SEPPs 95 in the other PLMNs 10.

The security of the interface between PLMNs 10 may also be quite important. Consider, for example, embodiments in which a D-SEPP 160 uses PRINS on an N32-f interface with a peer SEPP 95 or peer D-SEPP 160 of another PLMN 10. As discussed above, the D-SEPP 160 (and not the R-SEPP 150) may be responsible for maintain roaming relations with other PLMNs 10 in certain embodiments of the distributed SEPP architecture disclosed herein. Accordingly, the R-SEPP 150 may not have a secure connection with the peer SEPP 95 or peer D-SEPP 160. In such embodiments, without some form of security between PLMNs 10, Information Elements (IEs) sent from the R-SEPP 150 to the D-SEPP 160 (e.g., via TLS) may be entirely in the clear before they are forwarded by the D-SEPP 160 to the other PLMN 10. Thus, without some form of security, PLMNs 10 adopting a distributed SEPP architecture may be unable to protect certain IEs that should only be readable by a PLMN 10 and/or its peer PLMN 10.

In view of the above, embodiments of the present disclosure take steps to protect certain information (e.g., IEs) that are transferred between PLMNs 10. In some such embodiments, the R-SEPP 150 requests, from the D-SEPP 160, a security credential (e.g., a public encryption key, a digital certificate) of the peer SEPP 95/D-SEPP 160. The security credential may be used, for example, to encrypt one or more IEs.

The request for the security credential is performed via the secure interface (e.g., a TLS connection) between the R-SEPP 150 and D-SEPP 160. Accordingly, embodiments of the present disclosure may require that the D-SEPP 160 already has the requested security credential when the security credential request is received, e.g., after the D-SEPP 160 has set up a further TLS connection to the SEPP/D-SEPP of the peer PLMN (hereinafter simply referred to as a peer SEPP).

For example, the D-SEPP 160 may perform a credential exchange with the peer SEPP over a secure interface, and provide the security credential of the peer SEPP to the R-SEPP 150 upon request via the TLS or PRINS connection between the D-SEPP 160 and R-SEPP 150. If the security credential is a digital certificate, the R-SEPP 150 may validate the certificate of the peer SEPP, and responsive to the certificate being valid, the R-SEPP 150 may extract the public key of the peer SEPP from the certificate. The public key may be used to encrypt one or more IEs and send them to the D-SEPP 160 (e.g., using PRINS, using JavaScript Object Notation (JSON) Web Encryption (JWE), or the like). The D-SEPP 160 may then send the encrypted IEs to the peer SEPP using PRINS (or other secure protocol).

Moreover, the D-SEPP may, in some embodiments, encrypt one or more other IEs (e.g., as described by a protection policy of the PLMN 10). In this regard, it may be advantageous for encrypted IEs to generally be comprised in the protection policy. Notwithstanding, the D-SEPP 160 of particular embodiments may put R-SEPP encrypted IEs into outgoing messages via the N32-f interface to the other PLMN.

Figure 4:
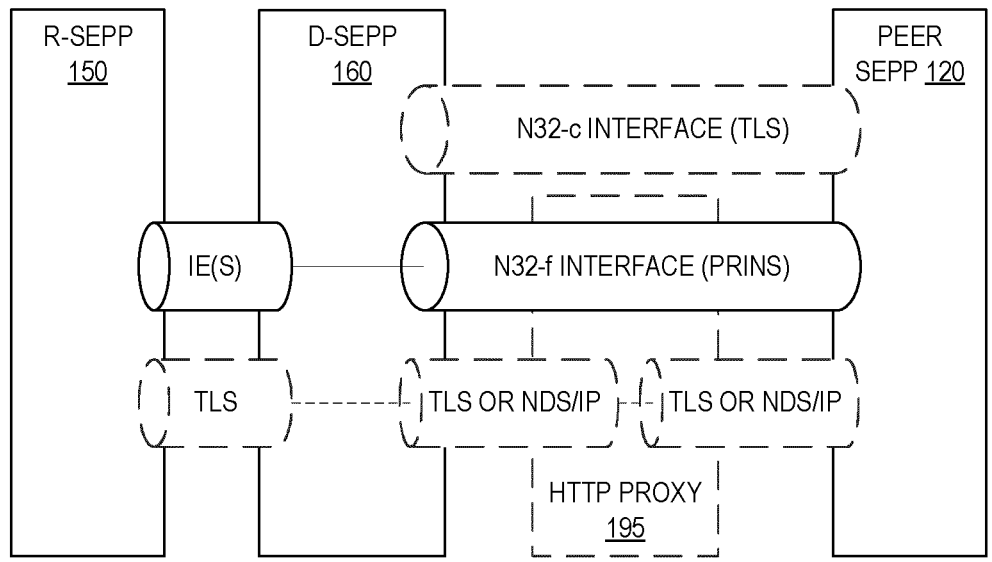
FIG. 4 is a schematic block diagram illustrating an example of a secure approach to transferring information between networks, according to one or more examples of the present disclosure.

FIG. 4 illustrates an example in which IEs are sent from an R-SEPP 150 to a D-SEPP 160. The R-SEPP may use any appropriate mechanism by which to protect the IEs, e.g., by encrypting the IEs using JWE or PASETO. The IEs received by the D-SEPP 160 are then sent from the D-SEPP 160 to a peer SEPP 120 via an N32-f interface, i.e., in encrypted form. In this way, IEs sent by the R-SEPP 150 via the D-SEPP 160 to the peer SEPP 120 are protected. In some embodiments, IEs may also be sent by the peer SEPP 120 back to the D-SEPP 160. In such embodiments, the D-SEPP 160 may decrypt the IEs and send them to the R-SEPP 150.

Although the D-SEPP in this example uses PRINS to support the N32-f interface to the peer SEPP 120, the D-SEPP 160 may additionally or alternatively support one or more TLS connections to the peer SEPP 120 and/or R-SEPP 150. In particular, the D-SEPP 160 may support an N32-c interface to the peer SEPP 120 that may be used to set up the N32-f interface. In some embodiments, one or more of the interfaces from the D-SEPP 160 passes through an HTTP Proxy 195. Additionally or alternatively, one or more of the interfaces from the D-SEPP 160 is based on a connection to the HTTP proxy 195 and the HTTP proxy 195 has a corresponding secure connection to the peer SEPP 120.

Figure 5:
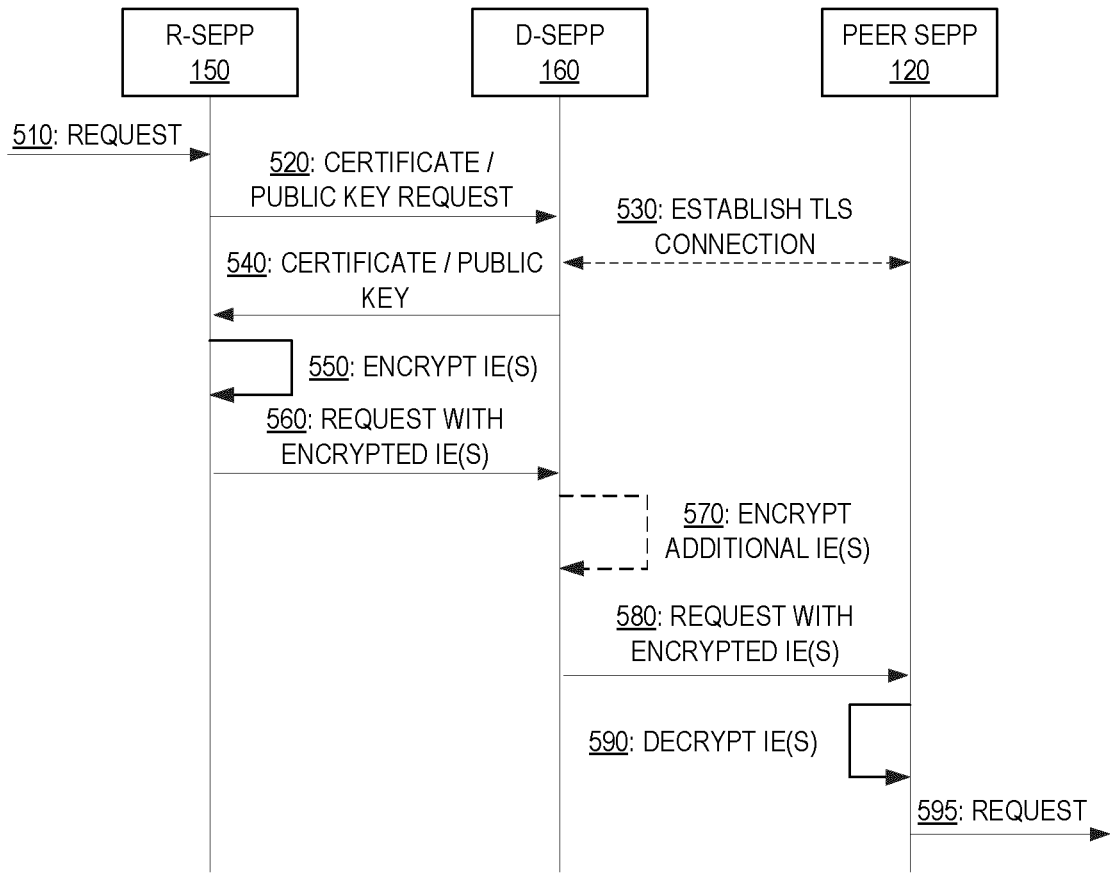
FIG. 5 is a call flow diagram illustrating an example process for securely transferring information between networks, according to one or more examples of the present disclosure.

FIG. 5 illustrates an example call flow in which the certificate and/or public key of the peer SEPP 120 is fetched by the R-SEPP 150 from the D-SEPP 160. In this example, both the R-SEPP 150 and the D-SEPP 160 are capable of encrypting IEs to be sent to the peer SEPP 120.

According to the example of FIG. 5, the R-SEPP 150 receives a request, e.g., from a node or NF in a PLMN 10 of the R-SEPP 150 (step 510). This request may, e.g., be a service request for a service provided by an entity outside of the PLMN 10. In response to the request, the R-SEPP 150 requests that the D-SEPP 160 provide a security credential (e.g., a certificate and/or public key) of the peer SEPP 120 (step 520). The D-SEPP 160 may (in some embodiments) establish a TLS connection to the peer SEPP 120 in response to having received the request for the security credential (step 530). For example, the D-SEPP 160 may establish the TLS connection to the peer SEPP 120 in order to obtain the requested security credential, to set up a secure channel over which to later forward the service request. Alternatively, the D-SEPP 160 may already have a TLS connection to the peer SEPP 120, in which case no new TLS connection may need to be established.

The D-SEPP 160 provides the requested security credential to the R-SEPP 150 (step 540), and the R-SEPP 150 encrypts one or more IEs using the security credential as discussed above (step 550). The R-SEPP 150 sends the service request along with the encrypted IEs to the D-SEPP 160 (step 560).

In response to receiving the service request with the encrypted IEs, the D-SEPP 160 may, in some embodiments, encrypt one or more additional IEs using the security credential of the peer SEPP 120 (step 570). The D-SEPP 160 sends the request with the encrypted IEs (and the additional encrypted IEs, if any) to the peer SEPP 120 (step 580).

In response to receiving the request with encrypted IEs, the peer SEPP 120 decrypts the IEs (and the additional IEs, if any) (step 590) and sends the service request towards its destination without the IEs included. Thus, one or more IEs are provided to the peer SEPP in a secure manner. It should be noted that once the D-SEPP 160 and the R-SEPP 150 have obtained the security credential of the peer SEPP 120, they may each retain that security credential for future use. For example, in response to a subsequent request arriving at the R-SEPP 150, steps 520, 530, and 540 may be omitted.

In view of all of the above, particular embodiments may split a standardized SEPP 95 into two roles, with a secure transport solution in between, and extend the SBI domain of the operator such that the D-SEPP 160 is permitted to be operated by another company without visibility of the D-SEPP deployment to other operators. In some such embodiments, the need to handle all roaming relations may be delegated to the D-SEPP 160 while the R-SEPP 150 (together with the D-SEPP 160) protects the operator border. In particular, the R-SEPP 150 may only allow traffic from known D-SEPPs 160.

Accordingly, embodiments of the present disclosure include a method 200 implemented by a security relay node (e.g., an R-SEPP 150) in a PLMN 10*a-f*, as illustrated in FIG. 6. The method 200 comprises relaying outbound control plane traffic, received from a source within the PLMN 10*a-f*, to a remote security node (e.g., a D-SEPP 160*a-m*) via a secure interface for delivery of the outbound control plane traffic to a further PLMN 10*a-f* (block 210). The remote security node is outside of both the PLMN 10*a-f* and the further PLMN 10*a-f*. The method 200 further comprises relaying inbound control plane traffic, received from the further PLMN 10*a-f* via the remote security node over the secure interface, to a destination within the PLMN 10*a-f* (block 220).

Other embodiments of the present disclosure include a method 300 implemented by a remote security node (e.g., a D-SEPP 160), as illustrated in FIG. 7. The method 300 comprises relaying outbound control plane traffic, received from a security relay node (e.g., an R-SEPP 150) within a PLMN 10*a-f* via a secure interface, to a further PLMN 10*a-f* (block 310). The remote security node is outside of both the PLMN 10*a-f* and the further PLMN 10*a-f*. The method 300 further comprises relaying inbound control plane traffic, received from a source within the further PLMN 10*a-f*, to the security relay node via the secure interface (block 320).

Figure 8:
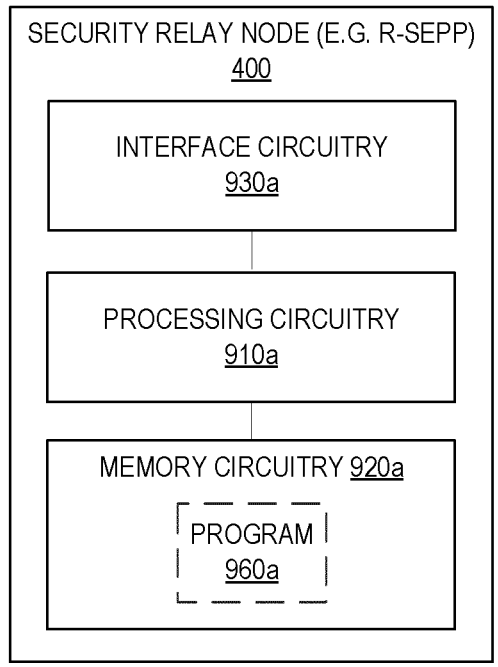
FIG. 8 is a schematic block diagram illustrating an example security relay node, according to one or more examples of the present disclosure.
Figure 9:
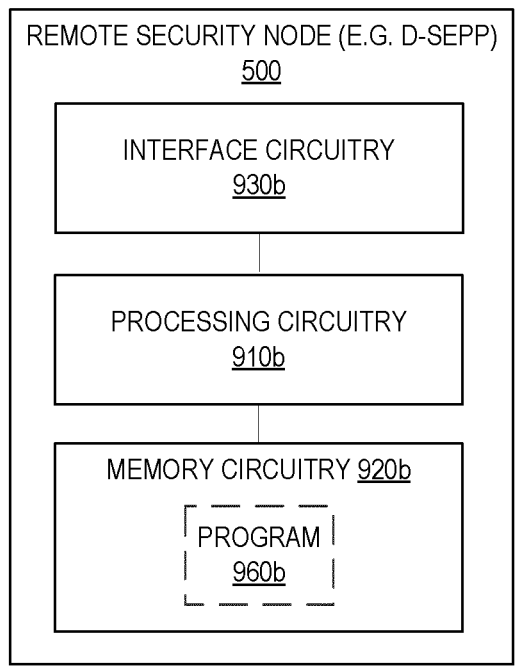
FIG. 9 is a schematic block diagram illustrating an example remote security node, according to one or more examples of the present disclosure.

Yet other embodiments of the present disclosure include the security relay node 400 and the remote security node 500 implemented according to the hardware illustrated in FIGS. 8 and 9, respectively. The example hardware of FIGS. 8 and 9 each comprise processing circuitry 910*a*, 910*b*, memory circuitry 920*a*, 920*b*, and interface circuitry 930*a*, 930*b*. In each respective node, the processing circuitry 910*a*, 910*b* is communicatively coupled to the memory circuitry 920*a*, 920*b* and the interface circuitry 930*a*, 930*b*, e.g., via one or more buses. The processing circuitry 910*a*, 910*b* may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910*a*, 910*b* may be programmable hardware capable of executing software instructions 960*a*, 960*b* stored, e.g., as a machine-readable computer program in the memory circuitry 920*a*, 920*b*. The memory circuitry 920*a*, 920*b* of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 930*a*, 930*b* may be a controller hub configured to control the input and output (I/O) data paths of its respective node 400, 500. Such I/O data paths may include data paths for exchanging signals over a communications network (e.g., a PLMN 10, an IPX 140, a Roaming Hub 170). For example, the interface circuitry 930*a*, 930*b* may comprise a transceiver configured to send and receive communication signals over a cellular network, Ethernet network, and/or an optical network.

The interface circuitry 930*a*, 930*b* may be implemented as a unitary physical component, or as a plurality of physical components that are contiguously or separately arranged, any of which may be communicatively coupled to any other, or may communicate with any other via the processing circuitry 910*a*, 910*b* of its respective node 400, 500. For example, the interface circuitry 930*a*, 930*b* may comprise output circuitry (e.g., transmitter circuitry configured to send communication signals over the communications network) and input circuitry (e.g., receiver circuitry configured to receive communication signals over the communications network).

According to embodiments of the hardware illustrated in FIG. 8, the processing circuitry 910*a* of the security relay node 400 is configured to, from within the PLMN 10*a-f*, relay outbound control plane traffic, received from a source within the PLMN 10*a-f*, to a remote security node 500 via a secure interface for delivery of the outbound control plane traffic to a further PLMN 10*a-f*. The remote security node 500 is outside of both the PLMN 10*a-f* and the further PLMN 10*a-f*. The processing circuitry 910*a* is further configured to relay inbound control plane traffic, received from the further PLMN 10*a-f* via the remote security node 500 over the secure interface, to a destination within the PLMN 10*a-f*.

According to embodiments of the hardware illustrated in FIG. 9, the processing circuitry 910*b* of the remote security node 500 is configured to relay outbound control plane traffic, received from a security relay node 400 within a PLMN 10*a-f* via a secure interface, to a further PLMN 10*a-f*. The remote security node 500 is outside of both the PLMN 10*a-f* and the further PLMN 10*a-f*. The processing circuitry 910*b* is further configured to relay inbound control plane traffic, received from a source within the further PLMN 10*a-f*, to the security relay node 400 via the secure interface.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the embodiments discussed herein are intended to be embraced.

Clauses

1. A method, implemented by a security relay node in a Public Land Mobile Network (PLMN), the method comprising:
    relaying outbound control plane traffic, received from a source within the PLMN, to a remote security node via a secure interface for delivery of the outbound control plane traffic to a further PLMN, the remote security node being outside of both the PLMN and the further PLMN;
    relaying inbound control plane traffic, received from the further PLMN via the remote security node over the secure interface, to a destination within the PLMN.
2. The method of embodiment 1, wherein the secure interface is based on a standardized N32 interface.
3. The method of any one of embodiments 1-2, wherein relaying the inbound and outbound data plane traffic comprises relaying using Transport Layer Security (TLS).
4. The method of any one of embodiments 1-3, further comprising exchanging, with the remote security node, control signaling associated with the secure interface.
5. The method of embodiment 4, wherein:
    the secure interface is an N32-f interface; and
    exchanging the control signaling comprises exchanging the control signaling via an N32-c interface to set up the N32-f interface.
6. The method of embodiment 4, wherein:
    relaying the outbound and inbound control plane traffic via the secure interface comprises relaying the outbound and inbound control plane traffic via a TLS connection; and
    exchanging the control signaling comprises exchanging the control signaling via the TLS connection.
7. The method of any one of embodiments 1-6, further comprising enabling discovery of the security relay node by at least one network function of the PLMN by registering with a Network Repository Function (NRF) of the PLMN as a Security Edge Protection Proxy (SEPP).
8. The method of any one of embodiments 1-7, further comprising hiding a topology of the PLMN from the further PLMN.
9. The method of any one of embodiments 1-8, further comprising using a telescopic fully qualified domain name of a network function in the PLMN to hide an address of the network function from the further PLMN.
10. The method of any one of embodiments 1-9, further comprising exchanging security certificates with the remote security node, wherein relaying the inbound and outbound control plane traffic is responsive to authenticating the remote security node using a security certificate of the remote security node.
11. The method of any one of embodiments 1-10, further comprising:
    encrypting an information element (IE) using an encryption key of a peer security node of the further PLMN obtained via the remote security node; and
    transmitting the encrypted IE to the peer security node via the remote security node.
12. The method of embodiment 11, further comprising obtaining the encryption key of the peer security node from the remote security node.
13. The method of any one of embodiments 1-12, wherein the remote security node is comprised in an Internet Protocol Exchange (IPX) network.
14. The method of any one of embodiments 1-12, wherein the remote security node is comprised in a roaming hub network.
15. A security relay node comprising:
    processing circuitry and a memory, the memory containing instructions executable by the processing circuitry whereby the security relay node is configured to, from within a Public Land Mobile Network (PLMN):
        relay outbound control plane traffic, received from a source within the PLMN, to a remote security node via a secure interface for delivery of the outbound control plane traffic to a further PLMN, the remote security node being outside of both the PLMN and the further PLMN;
        relay inbound control plane traffic, received from the further PLMN via the remote security node over the secure interface, to a destination within the PLMN.
16. The security relay node of the preceding embodiment, further configured to perform the method of any one of embodiments 2-14.
17. A computer program, comprising instructions which, when executed on processing circuitry of a security relay node, cause the processing circuitry to carry out the method according to any one of embodiments 1-14.
18. A carrier containing the computer program of the preceding embodiment, wherein the carrier is one of an electronic signal, optical signal, radio signal, or computer readable storage medium.
19. A method, implemented by a remote security node, the method comprising:
    relaying outbound control plane traffic, received from a security relay node within a Public Land Mobile Network (PLMN) via a secure interface, to a further PLMN, the remote security node being outside of both the PLMN and the further PLMN;
    relaying inbound control plane traffic, received from a source within the further PLMN, to the security relay node via the secure interface.
20. The method of embodiment 19, wherein the secure interface is based on a standardized N32 interface.
21. The method of any one of embodiments 19-20, wherein relaying the inbound and outbound control plane traffic comprises relaying using Transport Layer Security (TLS).
22. The method of any one of embodiments 19-21, further comprising exchanging, with the security relay node, control signaling associated with the secure interface.
23. The method of embodiment 22, wherein:
    the secure interface is an N32-f interface; and
    exchanging the control signaling comprises exchanging the control signaling via an N32-c interface to set up the N32-f interface.
24. The method of embodiment 22, wherein:
    relaying the outbound and inbound control plane traffic via the secure interface comprises relaying the outbound and inbound control plane traffic via a TLS connection; and
    exchanging the control signaling comprises exchanging the control signaling via the TLS connection.

25. The method of any one of embodiments 19-24, further comprising:
   relaying further control plane traffic between the PLMN and an additional PLMN; and
   isolating the inbound and outbound control plane traffic relaying between PLMN and the further PLMN from the further control plane traffic relayed between the PLMN and the additional PLMN.

26. The method of any one of embodiments 19-25, further comprising hiding a topology of the PLMN from the further PLMN.

27. The method of any one of embodiments 19-26, further comprising exchanging security certificates with the security relay node, wherein relaying the inbound and outbound control plane traffic is responsive to authenticating the security relay node using a security certificate of the security relay node.

28. The method of any one of embodiments 19-27, further comprising:
   receiving, from the security relay node, an information element (IE) encrypted with an encryption key of a peer security node of the further PLMN; and
   forwarding the encrypted IE to the peer security node.

29. The method of embodiment 28, further comprising:
   encrypting a further IE with the encryption key of the peer security node; and
   forwarding the encrypted further IE along with the encrypted IE to the peer security node.

30. The method of any one of embodiments 28-29, further comprising:
   obtaining the encryption key of the peer security node from the peer security node; and
   providing the encryption key of the peer security node to the security relay node.

31. The method of any one of embodiments 19-30, wherein the remote security node is comprised in an Internet Protocol Exchange (IPX) network.

32. The method of any one of embodiments 19-30, wherein the remote security node is comprised in a roaming hub network.

33. A remote security node comprising:
   processing circuitry and a memory, the memory containing instructions executable by the processing circuitry whereby the security relay node is configured to:
      relay outbound control plane traffic, received from a security relay node within a Public Land Mobile Network (PLMN) via a secure interface, to a further PLMN, the remote security node being outside of both the PLMN and the further PLMN;
      relay inbound control plane traffic, received from a source within the further PLMN, to the security relay node via the secure interface.

34. The remote security node of the preceding embodiment, further configured to perform the method of any one of embodiments 20-32.

35. A computer program, comprising instructions which, when executed on processing circuitry of a remote security node, cause the processing circuitry to carry out the method according to any one of embodiments 19-32.

36. A carrier containing the computer program of the preceding embodiment, wherein the carrier is one of an electronic signal, optical signal, radio signal, or computer readable storage medium.

The invention claimed is:

1. A method, implemented by a security relay node in a Public Land Mobile Network (PLMN), the method comprising:
   receiving, from a Network Function (NF) within the PLMN, a control packet to be provided to a further PLMN;
   delegating, to a remote security node, a setup of a N32-c interface towards the further PLMN such that the N32-c interface terminates at the remote security node; and
   relaying the control packet to a remote security node for delivery of the control packet, over an N32-f interface, towards the further PLMN, the remote security node being outside of both the PLMN and the further PLMN.

2. The method of claim 1, further comprising establishing the N32-f interface between the security relay node and the remote security node.

3. The method of claim 2, wherein the relaying comprises relaying the control packet using Transport Layer Security (TLS).

4. The method of claim 2, further comprising exchanging, with the remote security node, control signaling associated with the secure interface.

5. The method of claim 2, wherein the secure interface is an N32-f interface.

6. The method of claim 1, further comprising encrypting at least an Information Element (IE) in the control packet prior to relaying the control packet.

7. The method of claim 6, wherein the encrypting comprises encrypting the IE using an encryption key of a peer security node of the further PLMN obtained via the remote security node.

8. The method of claim 7, further comprising obtaining the encryption key of the peer security node from the remote security node.

9. The method of claim 1, further comprising enabling discovery of the security relay node by at least one NF of the PLMN by registering with a Network Repository Function (NRF) of the PLMN as a Security Edge Protection Proxy (SEPP).

10. The method of claim 1, further comprising hiding a topology of the PLMN from the further PLMN.

11. The method of claim 1, further comprising using a telescopic fully qualified domain name of an NF in the PLMN to hide an address of the NF from the further PLMN.

12. The method of claim 1, wherein the remote security node is comprised in an Internet Protocol Exchange (IPX) network.

13. The method of claim 1, wherein the remote security node is comprised in a roaming hub network.

14. A security relay node comprising:
   processing circuitry and a memory, the memory containing instructions executable by the processing circuitry whereby the security relay node is configured to, from within a Public Land Mobile Network (PLMN):
      receive, from a Network Function (NF) within the PLMN, a control packet to be provided to a further PLMN;
      delegate, to a remote security node, a setup of an N32-c interface towards the further PLMN such that the N32-c interface terminates at the remote security node; and
      relay the control packet to a remote security node for delivery of the control packet, over an N32-f interface, towards the further PLMN, the remote security node being outside of both the PLMN and the further PLMN.

15. A non-transitory computer readable medium storing a computer program product for controlling a security relay node, the computer program product comprising software instructions that, when run on processing circuitry of the security relay node, cause the security relay node to:
  receive, from a Network Function (NF) within a Public Land Mobile Network (PLMN), a control packet to be provided to a further PLMN;
  delegate, to a remote security node, a setup of a N32-c interface towards the further PLMN such that the N32-c interface terminates at the remote security node; and
  relay the control packet to a remote security node for delivery of the control packet, over an N32-f interface, towards the further PLMN, the remote security node being outside of both the PLMN and the further PLMN.

16. A method, implemented by a remote security node, the method comprising:
  receiving, from a security relay node in a Public Land Mobile Network (PLMN), a control packet to be provided to a further PLMN;
  setting up, on behalf of the remote security node, an N32-c interface towards the further PLMN such that the N32-c interface terminates at the remote security node; and
  relaying the control packet, over an N32-f interface, towards the further PLMN;
  wherein the remote security node being outside of both the PLMN and the further PLMN.

17. The method of claim 16, further comprising establishing the N32-f interface between the security relay node and the remote security node, wherein the receiving comprises receiving the control packet over the established N32-f interface.

18. The method of claim 17, wherein the receiving comprises receiving the control packet using Transport Layer Security (TLS).

19. The method of claim 16, wherein the receiving comprises receiving the control packet in which at least an Information Element (IE) is encrypted.

20. The method of claim 19, wherein at least the IE is encrypted using an encryption key of a peer security node of the further PLMN such that the remote security node is unable to decrypt it.

21. The method of claim 20, further comprising:
  obtaining the encryption key from the peer security node of the further PLMN; and
  providing the obtained encryption key to the remote security node.

22. The method of claim 16, further comprising hiding a topology of the PLMN from the further PLMN.

23. The method of claim 16, wherein the remote security node is comprised in an Internet Protocol Exchange (IPX) network.

24. The method of claim 16, wherein the remote security node is comprised in a roaming hub network.

25. A remote security node comprising:
  processing circuitry and a memory, the memory containing instructions executable by the processing circuitry whereby the remote security node is configured to:
    receive, from a security relay node in a Public Land Mobile Network (PLMN), a control packet to be provided to a further PLMN;
    set up, on behalf of the remote security node, an N32-c interface towards the further PLMN such that the N32-c interface terminates at the remote security node; and
    relay the control packet, over an N32-f interface, towards the further PLMN;
  wherein the remote security node being outside of both the PLMN and the further PLMN.

26. A non-transitory computer readable medium storing a computer program product for controlling a remote security node, the computer program product comprising software instructions that, when run on processing circuitry of the remote security node, cause the remote security node to:
  receive, from a security relay node in a Public Land Mobile Network (PLMN), a control packet to be provided to a further PLMN;
  set up, on behalf of the remote security node, an N32-c interface towards the further PLMN such that the N32-c interface terminates at the remote security node; and
  relay the control packet, over an N32-f interface, towards the further PLMN;
  wherein the remote security node being outside of both the PLMN and the further PLMN.

* * * * *